(12) United States Patent
Biro et al.

(10) Patent No.: US 11,014,756 B2
(45) Date of Patent: May 25, 2021

(54) INTEGRATED CONVEYOR MOTOR (71) Applicant: Nidec Motor Corporation, St. Louis, MO (US)

(72) Inventors: Joshua M. Biro, St. Charles, MO (US); William D. Moore, Florissant, MO (US); Richard J. Fadler, St. Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 16/892,959

(22) Filed: Jun. 4, 2020

(65) Prior Publication Data

US 2020/0385217 A1  Dec. 10, 2020

Related U.S. Application Data

(60) Provisional application No. 62/857,157, filed on Jun. 4, 2019.

(51) Int. Cl.
| | |
|---|---|
| *B65G 23/22* | (2006.01) |
| *B65G 41/00* | (2006.01) |
| *F16C 19/38* | (2006.01) |
| *B65G 23/04* | (2006.01) |

(52) U.S. Cl.
CPC ............ *B65G 23/22* (2013.01); *B65G 23/04* (2013.01); *B65G 41/008* (2013.01); *F16C 19/38* (2013.01); *B65G 2812/02148* (2013.01); *B65G 2812/02158* (2013.01); *F16C 2326/58* (2013.01)

(58) Field of Classification Search
CPC ........ B65G 23/04; B65G 23/22; B65G 23/24; B65G 41/008; B65G 2812/02148; B65G 2812/025158; F16C 19/38; F16C 2326/58
See application file for complete search history.

(56) References Cited

U.S. PATENT DOCUMENTS

| | | | | |
|---|---|---|---|---|
| 5,105,936 | A | * | 4/1992 | Stapper .................. B65G 23/22 198/832 |
| 5,692,597 | A | * | 12/1997 | Ferguson ............... B65G 15/00 198/841 |
| 7,806,254 | B2 | * | 10/2010 | Brayman ............... B65G 15/00 198/832 |
| 9,212,002 | B2 | * | 12/2015 | Kliefoth ................. B65G 15/28 |
| 9,573,765 | B2 | * | 2/2017 | Becker ................... B65G 15/28 |
| 9,752,652 | B2 | | 9/2017 | Moore |
| 9,790,032 | B2 | * | 10/2017 | Lautenschlager ........ H02K 5/10 |
| 10,131,502 | B2 | * | 11/2018 | Ramezani .............. B65G 13/07 |
| 10,230,284 | B2 | | 3/2019 | Moore |
| 10,458,237 | B2 | | 10/2019 | Biro |

(Continued)

*Primary Examiner* — Gene O Crawford
*Assistant Examiner* — Keith R Campbell
(74) *Attorney, Agent, or Firm* — Hovey Williams LLP (57) ABSTRACT

A conveyor system includes a conveyor assembly. The conveyor assembly includes a conveyor module, a power module, and a chassis supporting the conveyor module and the power module. The conveyor module includes a roller rotatable about an axis and a conveyor belt shiftable in response to rotation of the roller. The power module provides rotational power to the roller. The power module includes a power assembly and a drive configured to transmit rotational power to the roller from the power assembly. The power assembly includes a power source and a housing at least substantially surrounding the power source. The chassis integrally forms a portion of the housing.

18 Claims, 8 Drawing Sheets

(56) References Cited

U.S. PATENT DOCUMENTS

| | | |
|---|---|---|
| 10,547,229 B2 | 1/2020 | Biro |
| 10,549,916 B2 * | 2/2020 | Pajevic .................. B60P 1/649 |
| 2019/0352098 A1 | 11/2019 | Levine |
| 2020/0102151 A1 | 4/2020 | Lindemann et al. |

* cited by examiner

INTEGRATED CONVEYOR MOTOR

CROSS-REFERENCE TO RELATED APPLICATION

1. Priority Application

The present application claims the benefit of and priority from U.S. Provisional Patent Application No. 62/857,157, filed Jun. 4, 2019, the entire disclosure of which is hereby incorporated by reference herein.

BACKGROUND OF THE INVENTION

1. Field of the Invention

The present invention relates generally to a motor-driven conveyor assembly.

2. Discussion of the Prior Art

Conveyor assemblies with motor-driven conveyor belts are often used in the materials handling industry for transport and/or distribution of goods in a workspace such as a commercial warehouse. Some known conveyor systems include a scrolling belt supported by a pair of rollers, with one of the rollers being rotatably powered by a motor via indirect attachment thereto (e.g., via a transmission such as a pulley drive).

However, conventional conveyor assemblies have various deficiencies. Among other things, for instance, conveyor assemblies with pulley drives conventionally use tensioning mechanisms that make the conveyor assemblies expensive to manufacture and maintain.

SUMMARY

According to one aspect of the present invention, a conveyor system includes a conveyor assembly. The conveyor assembly comprises a conveyor module, a power module, and a chassis supporting the conveyor module and the power module. The conveyor module includes a roller rotatable about an axis and a conveyor belt shiftable in response to rotation of the roller. The power module provides rotational power to the roller. The power module includes a power assembly and a drive configured to transmit rotational power to the roller from the power assembly. The power assembly includes a power source and a housing at least substantially surrounding the power source. The chassis integrally forms a portion of the housing.

Among other things, provision of a chassis that integrally forms a portion of the power assembly housing facilitates reduced conveyor system weight, decreased component counts, and increased simplicity.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Figure 1:
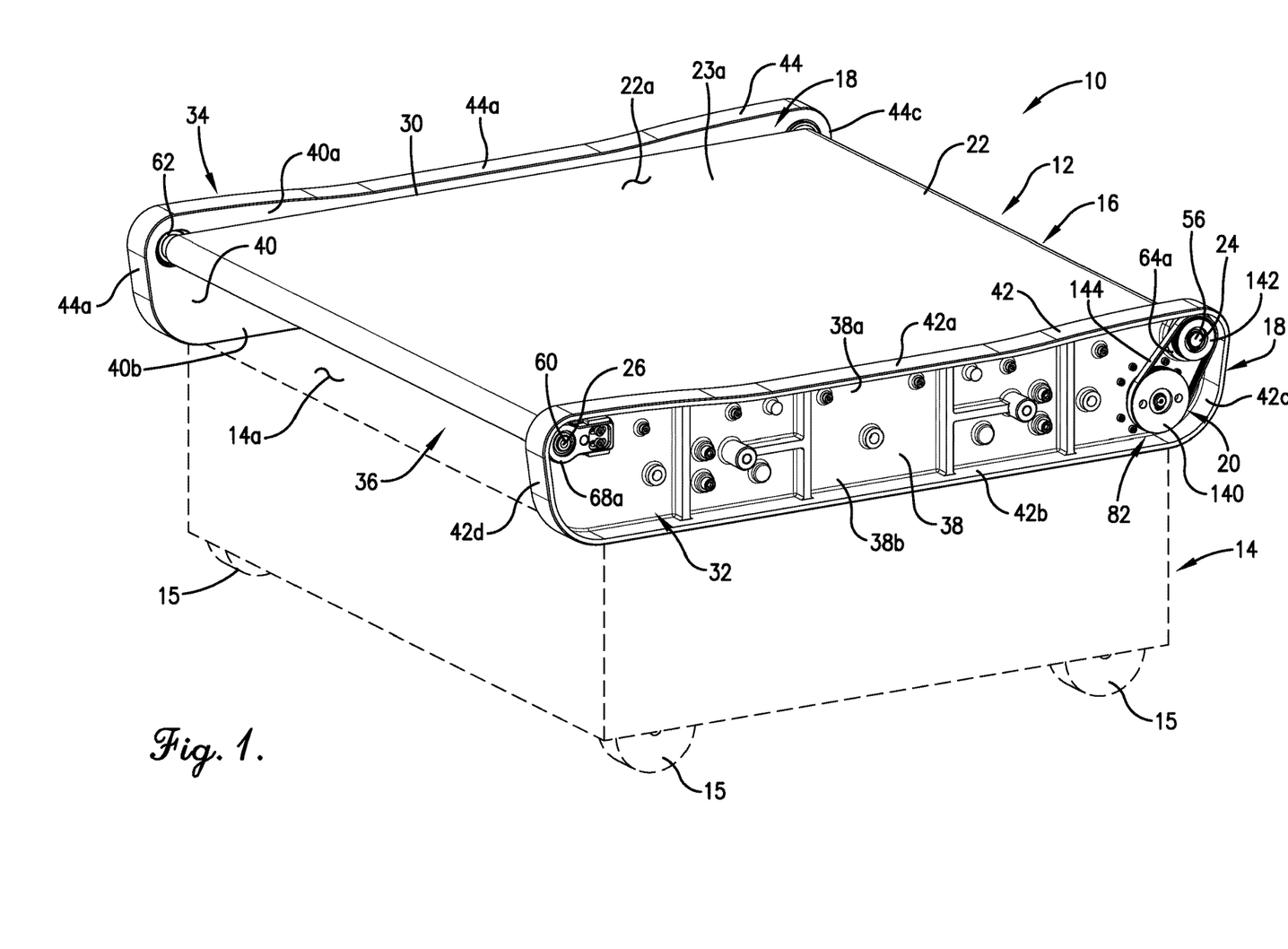
FIG. 1 is a rear side perspective view of a mobile conveyor system in accordance with a preferred embodiment of the present invention, wherein the mobile conveyor system includes a conveyor assembly and a vehicle supporting the conveyor assembly.
Figure 2:
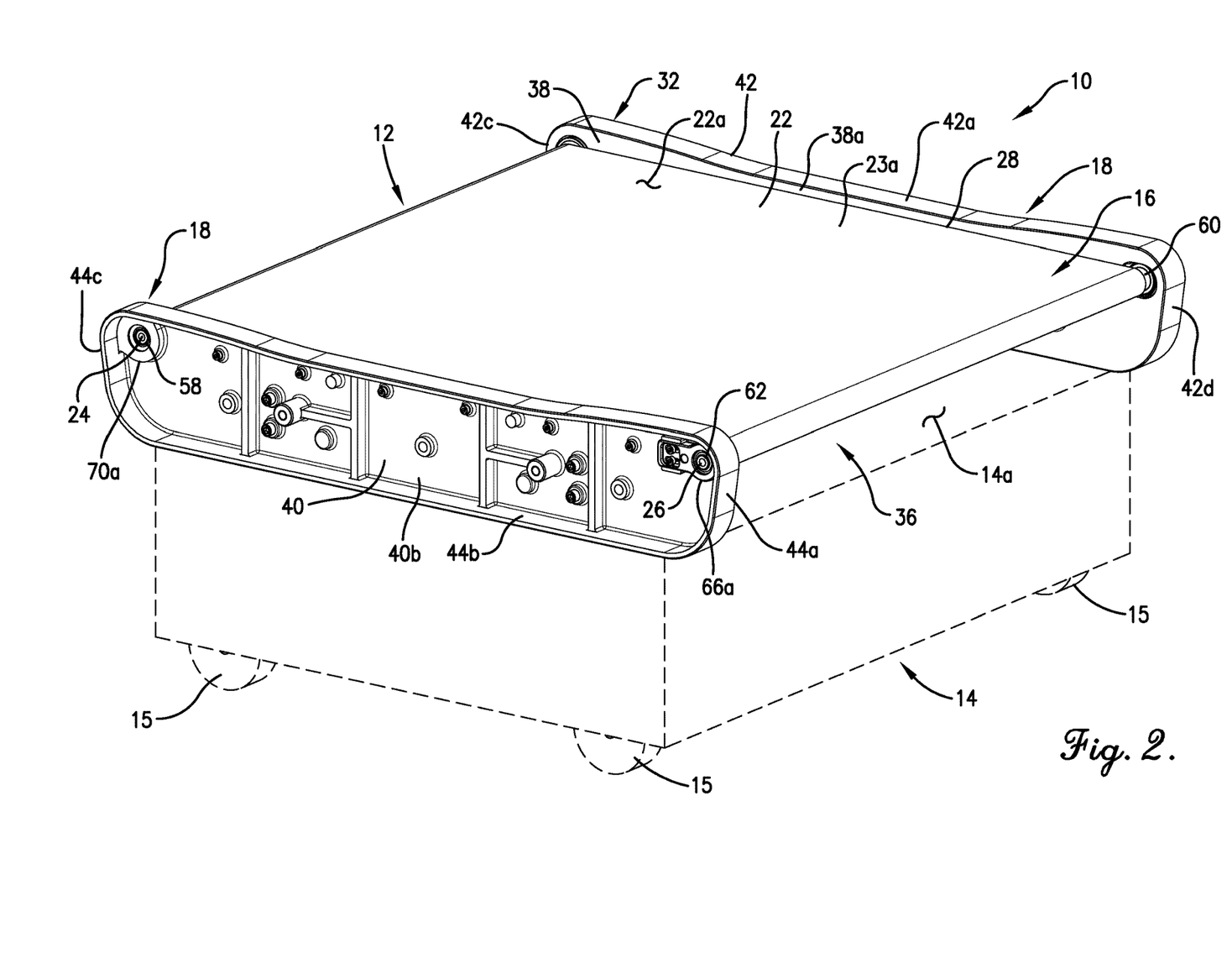
FIG. 2 is an alternate rear side perspective view of the mobile conveyor system of FIG. 1.
Figure 3:
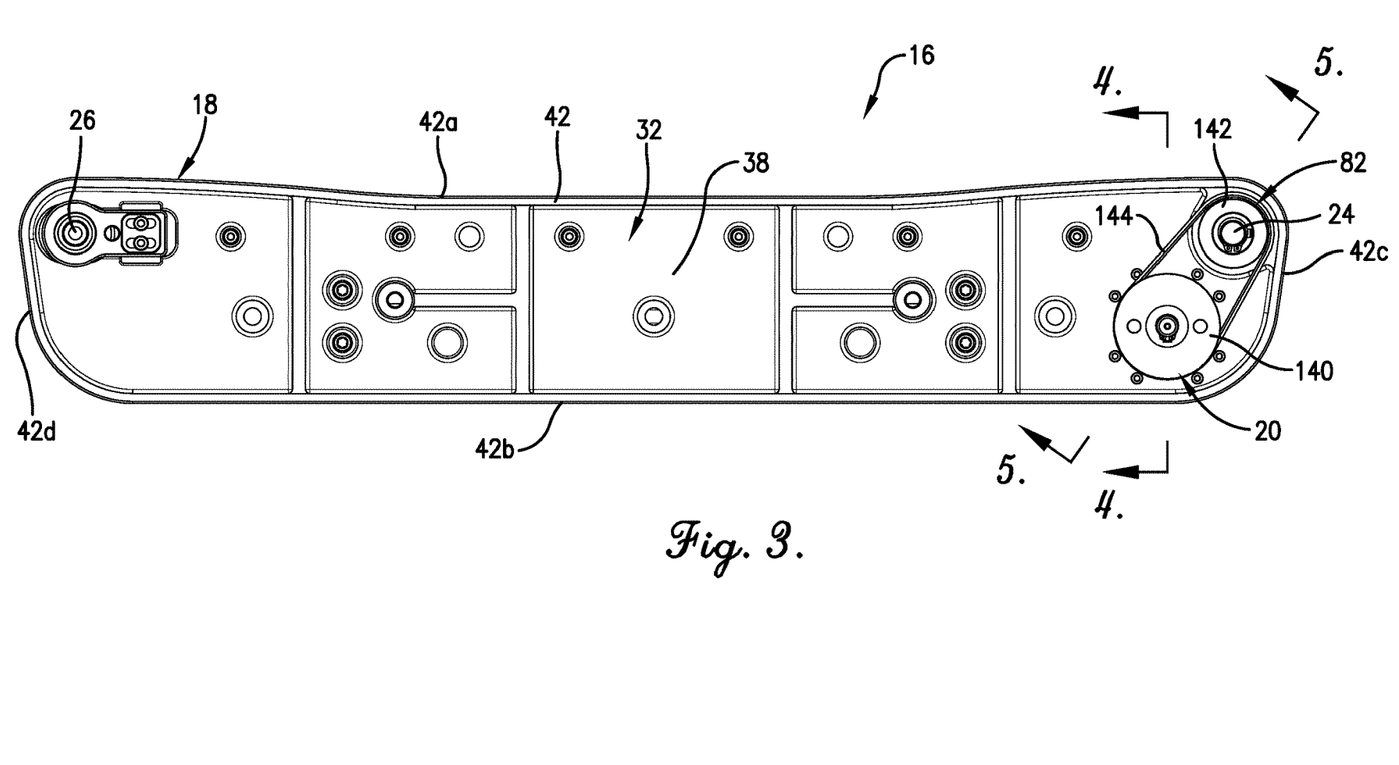
FIG. 3 is a side view of the conveyor assembly of FIGS. 1 and 2.

With initial reference to FIGS. 1 and 2, a mobile conveyor system 10 is provided. The mobile conveyor system 10 preferably comprises a conveyor assembly 12 and a vehicle 14 (shown schematically in hidden line). The conveyor assembly 12 is preferably mounted on and supported by the vehicle 14 in any manner providing suitable stability. More particularly, the conveyor assembly 12 preferably is fixed to a top surface 14a of the vehicle 14.

The vehicle 14 is preferably moveable to facilitate positioning/repositioning of the conveyor system 10 as a whole and, consequently, of the conveyor assembly 12. In the illustrated embodiment, for instance, the vehicle 14 includes a plurality of wheels 15.

Most preferably, the vehicle 14 is powered, such that selective movement of the vehicle 14 may be accomplished through use of one or more vehicle motors (not shown) or other power sources. In a preferred embodiment, for instance, each of the wheels 15 is a drive wheel powered by a respective motor.

Movement of the vehicle 14 is most preferably automated, with the vehicle 14 being an autonomous guided vehicle (AGV) or robot. Detailed descriptions of suitable embodiments of the vehicle 14 may be found in U.S. patent application Ser. No. 14/960,138, U.S. patent application Ser. No. 15/047,244, U.S. patent application Ser. No. 15,331, 560, and U.S. patent application Ser. No. 15/433,923, each of which is incorporated in its entirety by reference herein.

Although a vehicle of the type described above is preferred, it is noted that movement may be controlled in any one or more of a variety of manners without departing from the scope of the present invention. For instance, vehicle movement might be controlled through an onboard user interface, be controlled remotely, or be manually controlled.

Still further, movement of the vehicle may be facilitated in a manner other than or in addition to wheeled rolling. For instance, the vehicle might additionally or alternatively be slidable, tracked, etc.

It is also permissible according to some aspects of the present invention for the conveyor assembly to be intended for stationary placement or have a limited range of motion. In such an instance, the vehicle might be omitted and replaced with a framework or other supporting structure fulfilling the particular positioning needs of the given application.

In a preferred embodiment, the conveyor assembly 12 broadly includes a conveyor module 16, a chassis 18, and a power module 20. As will be discussed in greater detail below, the conveyor assembly 12 is configured to facilitate the advancement of one or more items (not shown) supported thereon.

The conveyor module 16 preferably includes a conveyor belt 22, a drive or powered roller 24, and a driven or following/passive roller 26. The conveyor belt 22 preferably extends in fore and aft directions along a fore-aft or longitudinal axis of the conveyor module 16. The drive roller 24 and the driven roller 26 preferably extend parallel to one another and orthogonal to the longitudinal axis, in lateral or side-to-side directions. The rollers 24 and 26 are furthermore spaced from one another in the fore and aft direction (i.e., along the longitudinal axis).

The conveyor belt 22 preferably extends along the longitudinal or fore-aft axis to form a single, continuous (i.e., endless) loop around the rollers 24 and 26. More particularly, the conveyor belt 22 presents discrete lateral sides 28 and 30 but has no fore or aft edges. As will be discussed in greater detail below, rotation of the rollers 24 and 26 results in corresponding circulation of the conveyor belt 22 such that a given portion of the conveyor belt 22 presents an upper belt surface 22a thereof at one moment but later, upon sufficient rotation of the rollers 24 and 26, presents a lower belt surface 22b the conveyor belt 22. Furthermore, at any given moment, the conveyor belt 22 presents an upper run 23a extending between and above the rollers 24 and 26, as well as a lower run 23b extending between and below the rollers 24 and 26.

Most preferably, the conveyor belt 22 is entirely continuous, although it is permissible according to some aspects of the present invention for one or more discontinuities such as slots or openings to be formed therein. However, at least some degree of longitudinal continuity is most preferable to ensure efficient scrolling operability as described above.

It is also noted that it is permissible according to some aspects of the present invention for the belt itself to include a plurality of mini-belts, roller segments, or other components that collectively or collaboratively present an item-supporting surface and function in a scrolling manner as noted above. Furthermore, the conveyor assembly or conveyor module described herein might be sub-components of a larger system.

The items supported by the conveyor belt 22 (i.e., disposed on the upper belt surface 22a thereof) may be of any one or more of a variety of types. For instance, one or more of the items might be a package or container such as a box, envelope, mailer, tube, carton, bag, tub, tote, can, drum, or crate. One or more of the items might instead or additionally be an unpackaged good or a bulk material (e.g., a particulate matter, etc.)

The chassis 18 preferably comprises a pair of laterally spaced apart first and second side rails 32 and 34 disposed adjacent respective ones of the sides 28 and 30 of the conveyor belt 22. The first and second side rails 32 and 34 each preferably broadly extend both along and orthogonally to the longitudinal axis so as to be parallel to each other. Skewed rails or portions of the rails are permissible according to some aspects of the present invention, however.

The chassis 18 and, more particularly, the side rails 32 and 34, preferably rest on the vehicle 14 in such a manner as to elevate the conveyor belt 22 relative to the vehicle 14. That is, a gap 36 is formed between the vehicle 14 and the bottom surface 22b or lower run 23b of the conveyor belt 22.

The first and second side rails 32 and 34 are structurally similar in many regards but diverge with regard to structure associated with the aforementioned power module 20. For clarity, the first side rail 32 will therefore be referred to herein as the drive side rail 32. In contrast, the second side rail 34 will continue to be referred to herein simply as the second side rail 34. Key distinctions between the side rails 32 and 34 will be discussed in greater detail below.

With regard to common features, however, each of the side rails 32 and 34 includes a respective sidewall 38 or 40 extending upwardly and downwardly relative to the conveyor belt 22 such than a exposed upper portion 38a or 40a extends upwardly relative to the upper belt surface 22a or upper run 23a, and a lower portion 38b or 40b extends downwardly relative to the lower belt surface 22b or lower run 23b.

The drive side rail 32 further preferably includes a flange 42 including upper, lower, fore, and aft sections 42a, 42b, 42c, and 42d. The second side rail 34 similarly preferably includes a flange 44 including upper, lower, fore, and aft sections 44a, 44b, 44c, and 44d. The flanges 24 and 44 each extend laterally outwardly from the corresponding one of the sidewalls 38 and 40. The lower sections 42b and 44b of the flanges 42 and 44, respectively, are preferably configured to directly abut (i.e., rest on) the vehicle 14, although other configurations fall within the scope of the present invention.

In a broad sense, the side rails 32 and 34 provide lateral guidance to the conveyor belt 22, offer structural support to the conveyor module 16, protect and support various components of the conveyor assembly 12, and to at least some extent protect personnel from inadvertent contact with components of the conveyor assembly 12.

Figure 4:
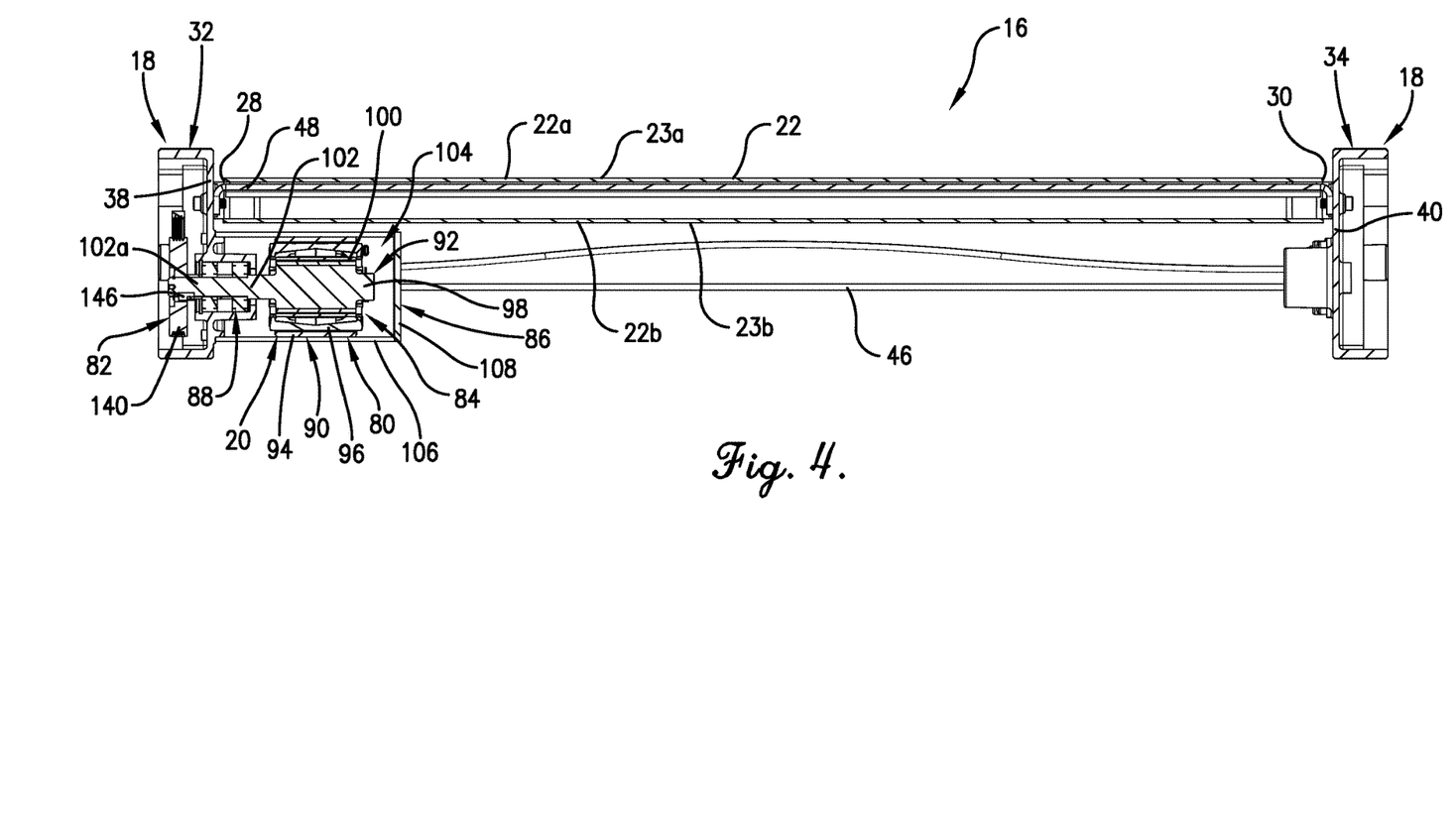
FIG. 4 is rear elevational view of the conveyor assembly of FIG. 3, taken along line 4-4 of FIG. 3.

In addition to the side rails 32 and 34, the chassis 18 further preferably includes a subframe 46 that extends between and interconnects the side rails 32 and 34. Still further, the chassis 18 preferably includes a slider bed 48 (see FIG. 4) extending between the side rails 32 and 34 and below at least a portion of the upper run 23*b* of the conveyor belt 22 to support the upper run 23*b*.

The drive or powered roller 24 preferably includes a tubular roller body 50 presenting lateral ends 50*a*,50*b* and a pair of bearing adapters or roller inserts 56 and 58 in part received within and secured to respective ones of the ends 50*a*,50*b*. As will be discussed in more details below, the roller insert 56 is a drive insert 56 and varies slightly in structure from the other insert 58.

The driven or following/passive roller 26 is preferably similarly constructed to the drive roller 24, including a tubular roller body (not shown) and a pair of bearing adapters or roller inserts 60 and 62 most preferably constructed similarly or identically to the insert 58. Alternative configurations fall within the scope of the present invention, however.

The drive roller 24 is preferably rotatably supported on the chassis 18 by a pair of roller-supporting bearings 64 and 66. Similarly, the driven roller 26 is preferably supported on the chassis 18 by a pair of roller-supporting bearings 68 and 70. More particularly, in a preferred embodiment, each of the bearings 64, 66, 68, and 70 is supported in a respective seat 64*a*, 66*a*, 68*a*, 70*a* formed by the chassis 18.

Figure 8:
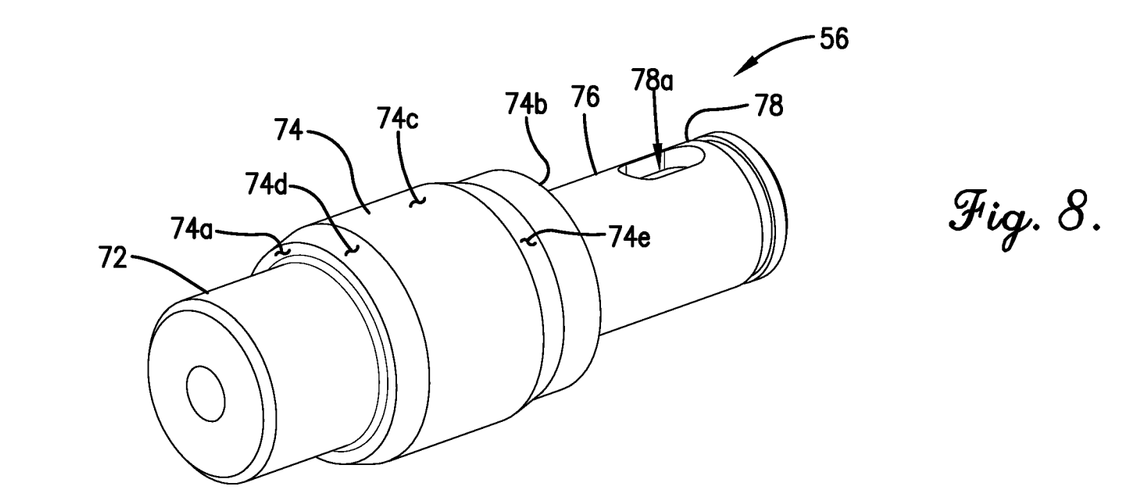
FIG. 8 is a perspective view of drive roller bearing adapter or insert.
Figure 9:
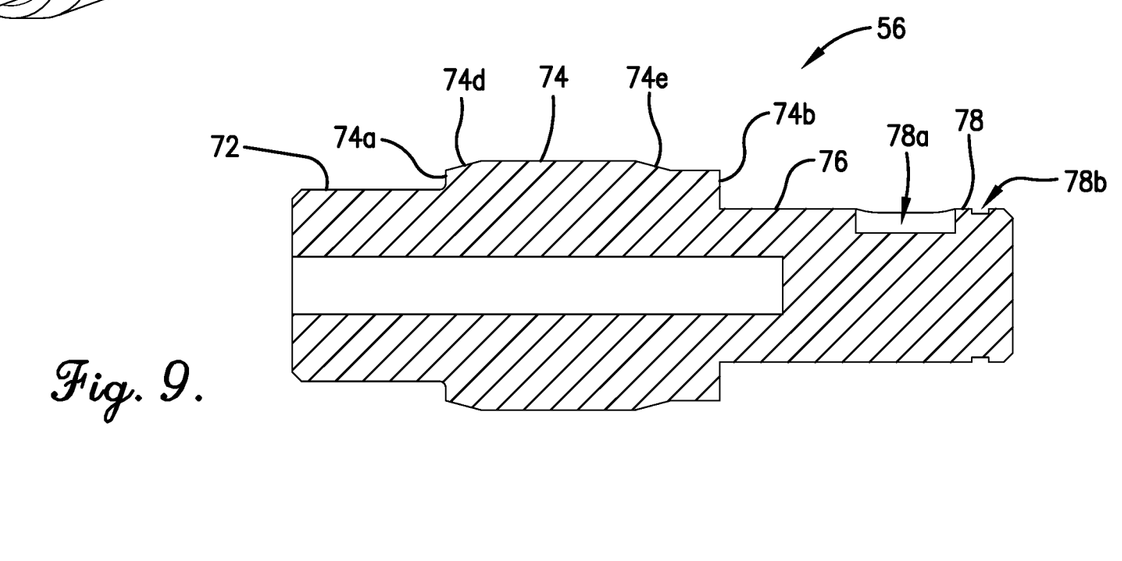
FIG. 9 is a cross-sectional view of the drive roller bearing adapter or insert of FIG. 8.

The drive insert 56 is shown in detail in FIGS. 8 and 9. As illustrated, the drive insert 56 preferably includes a circumferentially constricted inboard connector portion 72, a circumferentially enlarged intermediate or crown portion 74 outboard of the connector portion 72, and a bearing support portion 76 outboard of the crown portion 74 and circumferentially constricted relative thereto.

The connector portion 72 is preferably received within the corresponding end 52 of the roller body 50 such that the connector portion 72 and the roller body 50 rotate in unison.

The crown portion 74 preferably presents an inner shoulder 74*a* that engages the end 52 of the roller body 50 and an outer shoulder 74*b* that engages the roller-supporting bearing 64. The crown portion 74 further presents an upper face 74*c* that engages and guides the conveyor belt 22. Tapered faces 74*d* and 74*e* preferably extend from each lateral edge of the upper face 74*c*.

The roller-supporting bearing 64 is preferably disposed on the bearing support portion 76. More particularly, the roller-supporting bearing 64 preferably encircles the bearing support portion 76.

The drive insert 56 preferably further includes a pulley support portion 78 outboard of the bearing support portion 76. A slot 78*a* and a circumferential notch or groove 78*b* are preferably formed in the pulley support portion 78. The pulley support portion 78 will be discussed in greater detail below.

In a preferred embodiment, the inserts 58, 60, and 62 are identical to or very nearly identical to the drive insert 56 except in that they are devoid of a pulley support portion. However, it is permissible according to some aspects of the present invention for fully identical or more divergent inserts to be provided.

The power module 20 preferably includes a power assembly in the form of a motor assembly 80. The power module 20 further preferably includes a drive in the form of a pulley drive 82. The pulley drive 82 is operable to transmit driving power from the motor assembly 80 to the drive insert 56, rotating the drive roller 24 and advancing the conveyor belt 22.

In a preferred embodiment, the motor assembly 80 includes a motor 84, a housing 86, and a bearing assembly 88. The motor 84 is preferably an electric motor, although other motor types fall within the scope of the present invention. Non-motor power sources (for instance, batteries) might additionally or alternatively be provided without departing from the scope of some aspects of the present invention.

Most preferably, the motor 84 includes a stator 90 and a rotor 92. The rotor 92 is rotatable about a motor axis. The motor axis preferably extends laterally (i.e. perpendicularly to the longitudinal axis), although other axis orientations fall within the scope of certain aspects of the present invention.

The stator 90 preferably at least substantially circumscribes the rotor 92, such that the motor 84 is an inner rotor motor. Outer rotor motors or dual rotor motors fall within the scope of some aspects of the present invention, however.

The stator 90 preferably includes a stator core 94 and a plurality of electrically conductive coils 96 wound about the stator core 94.

Preferably, the rotor 92 includes a rotor core 98, a plurality of magnets 100, and a rotatable output shaft 102 (which may also be referred to as a motor or rotor shaft 102). The output shaft 102 preferably extends laterally outwardly beyond the rotor core 98 and the stator 90 for purposes to be discussed in greater detail below.

The motor housing 86 preferably in part defines a motor chamber 104 in which the motor 84 is at least substantially disposed. That is, in a preferred embodiment, the housing 86 at least substantially encloses the motor 84. In the illustrated embodiment, for instance, the housing 86 includes a cylindrical shell 106 and an inner end wall 108. The shell 106 preferably circumscribes the stator 90, the rotor core 98, the magnets 100, and a portion of the output shaft 102. The inner end wall 108 is preferably secured by any means known in the art (e.g., welding, adhesives, latches, threaded fasteners, bolts, and/or integral formation) to an inner end of the shell 10, such that the housing 86 is closed at an inboard end thereof.

The motor 84 is preferably integrally mounted to the chassis 18, with the drive side rail 32 of the chassis 18 forming part of the housing 86. More particularly, the drive side rail 32 defines an outer endshield 110 that is preferably integrally formed by the sidewall 38. The outer endshield 110 preferably includes a disc-shaped, vertically oriented end wall 112, a circumferentially extending outer mounting lip 114, and a bearing support structure 116. The shell 106 of the housing 86 preferably circumscribes and abuts the mounting lip 114.

Preferably, the shell 106 and, more broadly, the motor assembly 80 is removably mountable to the drive side rail 32. More particularly, the motor assembly 80 is preferably removably mounted to the outer endshield 110 formed by the drive side rail 32. For instance, the mounting lip 114 preferably fits securely (e.g., via a friction fit or close slip fit) into the shell 106 such that the shell 106 and, in turn, the inner end wall 108, are supported thereon. Furthermore, it is permissible for the shell to be secured to the lip and/or the end wall via removable fasteners (such as screws or bolts), latches, or other shiftable or reconfigurable means.

However, permanent or semi-permanent connection means, including but not limited to welding, adhesives, extremely tight fits (such as friction fits or thermal fits), and integral formation fall within the scope of some aspects of the present invention. It is also permissible according to some aspects of the present invention for the shell to instead be integrally formed with the chassis or, more particularly, the sidewall of the drive side rail.

Provision of an integrated outer endshield 110 formed by the chassis 18 as described above eliminates the need for a separate endshield component, resulting in advantageous reductions in cost, complexity, and weight. Various of the features described above, including but not limited to the mounting lip 114, also facilitate reduced usage of fasteners, resulting in advantageous reductions in cost, complexity, and weight. It is noted that, although weight reduction is often deemed advantageous in motor system design, reduced weight is particularly desirable in the present invention due to mounting of the conveyor assembly 12 on the vehicle 14. That is, reducing the load that must be supported by the vehicle 14 is highly preferred.

It is also permissible according to some aspects of the present invention for the motor assembly to be devoid of the shell and/or the inner endshield. In such an embodiment, the stator might be secured directly to the chassis via threaded fasteners extending axially through the stator core and into engagement with corresponding threaded openings in the chassis. Such openings might be formed in an integral receiving pad or other suitable region of the chassis, or instead in a discrete component mounted to the chassis.

In a preferred embodiment, the bearing support structure 116 comprises a cylindrical or tube-like main body 118 and a disc-like end 120 defining a shaft aperture 122. The main body 118, the aperture 122, and the motor shaft 102 are preferably coaxial, such that the motor shaft 102 extends centrally through the aperture 122 and into a bearing pocket 124 defined internally by the main body 118 and the end 120.

The aforementioned motor bearing assembly 88 preferably includes inner and outer motor bearings 126 and 128 disposed in the bearing pocket 124 and supported by the main body 118 of the bearing support structure 116. The motor bearings 126 and 128 in turn preferably rotatably support the rotor shaft 102 and, more broadly, the motor 84 relative to the outer endshield 110 and drive side rail 32. Thus, in a preferred embodiment, the motor 84 is supported directly on the chassis 18 in a simple, efficient, removable, and lightweight manner.

It is noted that the bearing 126 and 128 preferably support the shaft 102 and, in turn, the motor 84 in a cantilevered manner. However, it is permissible according to some aspects of the present invention for the bearings to be alternatively positioned (e.g., on opposite axial ends of the rotor or shaft).

In a preferred embodiment, appropriate lateral positioning of the motor bearings 126 and 128 is effected by a spacer sleeve 130 disposed between the motor bearings 126 and 128, a retaining ring 132 secured in a groove 134 in the main body 118 adjacent the outer bearing 128, and a wavy washer 136 disposed between the inner bearing 126 and the end 120. An additional spacer sleeve 138 is disposed outboard of the outer bearing 128 to facilitate positioning of the outer bearing 128 relative to the pulley drive 82.

The motor bearings 126 and 128 are each preferably unit bearings. That is, the components of the motor bearings 126 and 128 are preferably pre-packed and fully enclosed. Such a configuration is advantageous in, among other things, preventing contaminant ingress. Other types of bearings are permissible according to some aspects of the present invention, however.

As noted previously, the pulley drive 82 is preferably operable to transmit rotational power from the rotor 92 to the drive insert 56 and drive or powered roller 24, resulting in fore or aft travel of the conveyor belt 22. As will be discussed in greater detail below, the pulley drive 82 preferably broadly includes a drive or powered pulley 140, a driven or passive/following pulley 142, and an endless or continuously extending drive belt 144.

More particularly, the drive or powered pulley 140 is preferably mounted to an outermost end 102a of the motor shaft 102 and spaced outwardly from the outer bearing 128 by means of the spacer sleeve 138.

Preferably, the drive pulley 140 is secured to rotate with the motor shaft 102 by means of a key 146 received in corresponding shaft and pulley slots 148 and 150, respectively. That is, the key 146 preferably ensures that rotation of the output shaft 102 corresponds directly to rotation of the drive pulley 140. However, other interconnection means facilitating cooperative rotation of the motor shaft and the drive pulley may additionally or alternatively be used.

The driven or passive/following pulley 142 is preferably disposed above and at least in part in lateral alignment with the drive or powered pulley 140. That is, the drive pulley 140 and the driven pulley 142 are at least in part coplanar in a vertical and fore-aft plane. Most preferably, such plane extends parallel to the longitudinal axis.

The driven pulley 142 is preferably mounted to the pulley support portion 78 of the drive insert 156. Most preferably, the driven pulley 142 is secured to rotate with the driven insert 156.

The drive belt 144 preferably extends in a loop about both of the pulleys 140 and 142 and is also at least in part co-planar therewith.

It is noted that correct positioning of the drive belt and pulleys 140 and 142 via co-planarity, appropriate pulley spacing, etc. is essential to efficient operation of the pulley drive 82. As will be discussed in greater detail below, the present invention advantageously facilitates correct positioning of these components.

For instance, outward lateral shifting of the drive or powered pulley 140 (along with attached structures including the motor 84) is restricted primarily via engagement of the outer motor bearing 128 against the retaining ring 132 and engagement of the drive pulley 140 against a retaining ring 152 disposed about the motor shaft 102. Laterally inward shifting of the drive pulley 140 is restricted primarily via engagement of the of the inner motor bearing 126 relative to the end 120 of the bearing support structure 116, as modulated by the wavy washer 136. The spacer sleeves 130 and 138 also play a role in positioning of the drive pulley 140.

Figure 5:
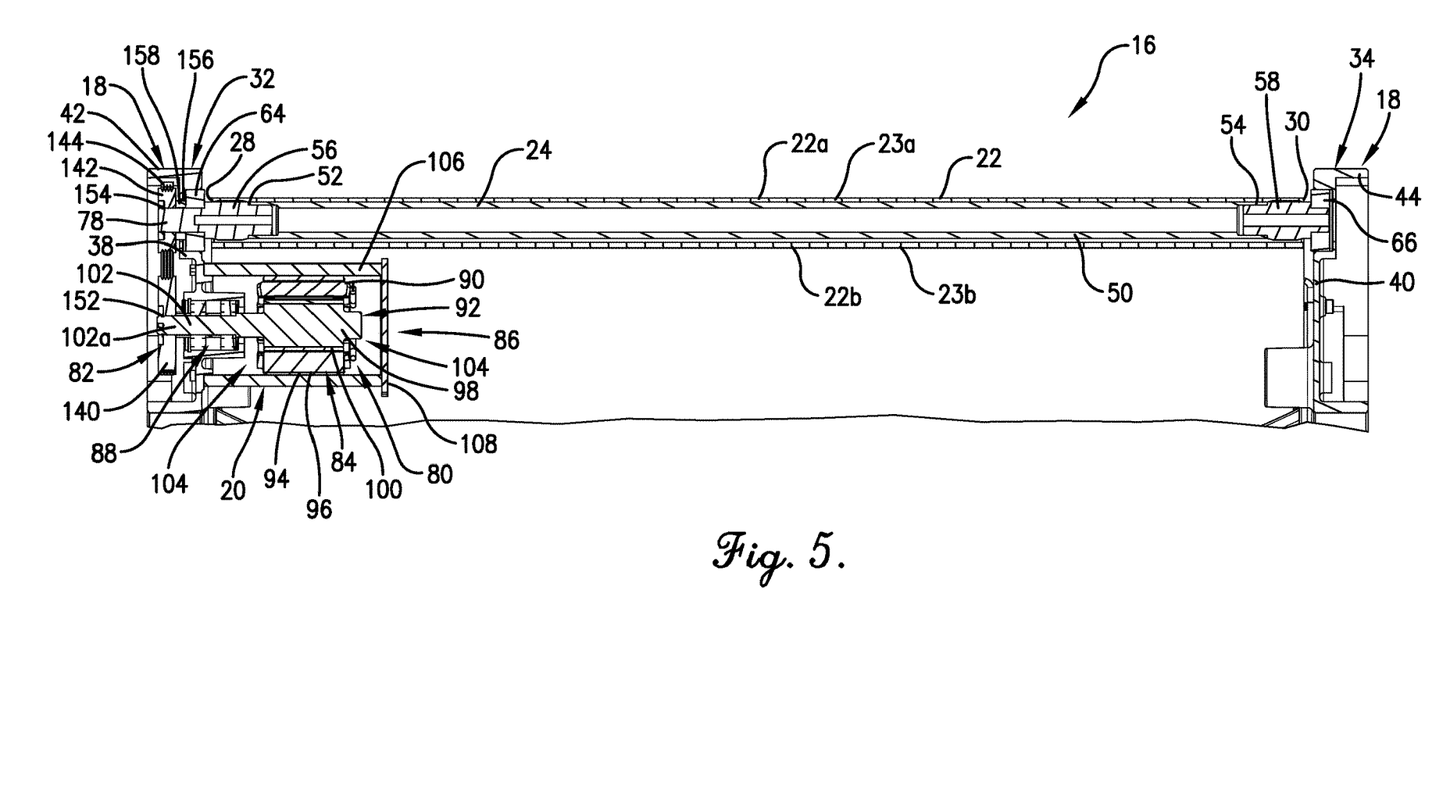
FIG. 5 is a cross-sectional view of the conveyor assembly of FIGS. 3 and 4, taken along line 5-5 of FIG. 3.
Figure 6:
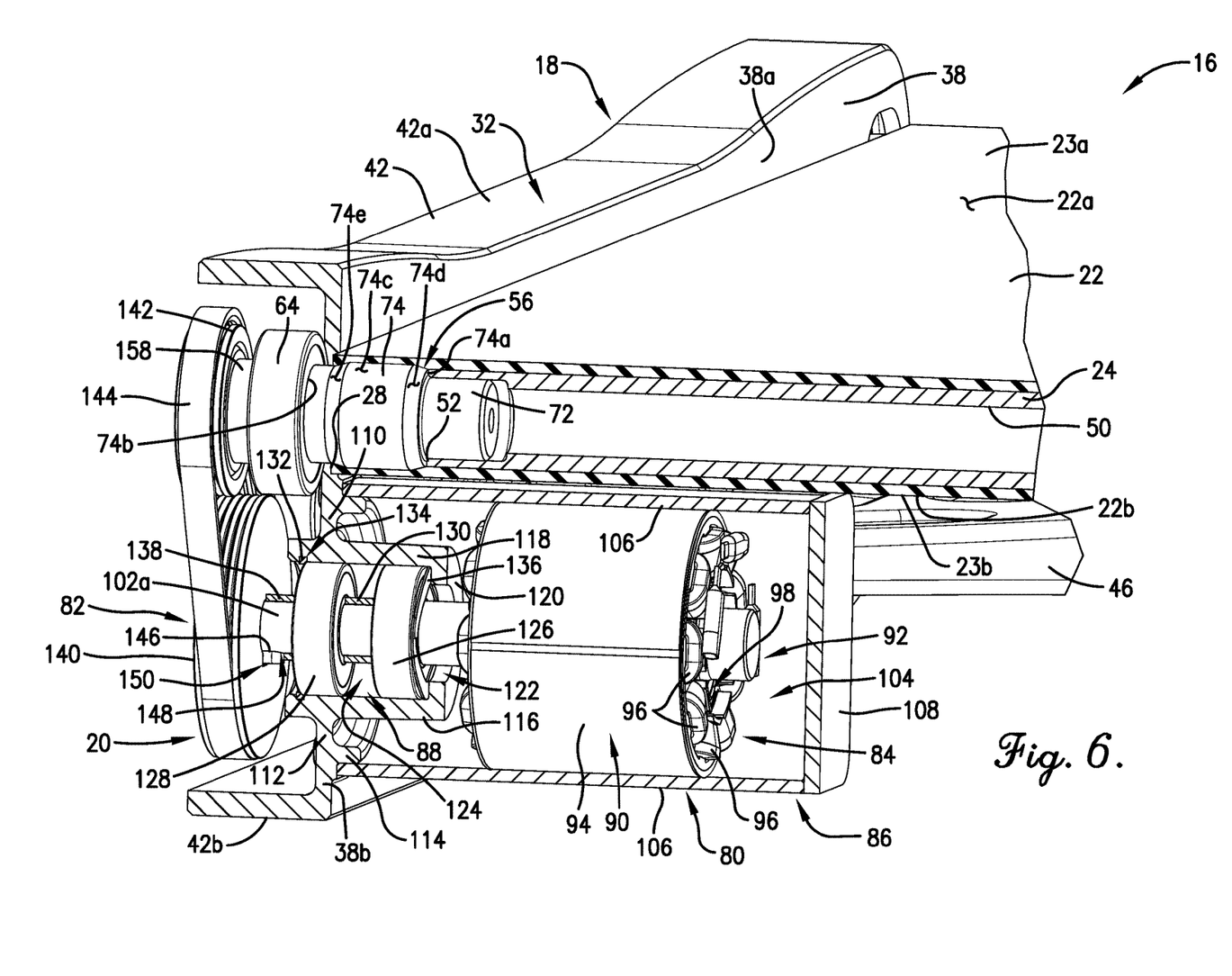
FIG. 6 is an enlarged, partially sectioned view of the conveyor assembly of FIGS. 3-5, particularly illustrating a portion of the drive roller, the power module, and motor mounting structure formed by the chassis.
Figure 7:
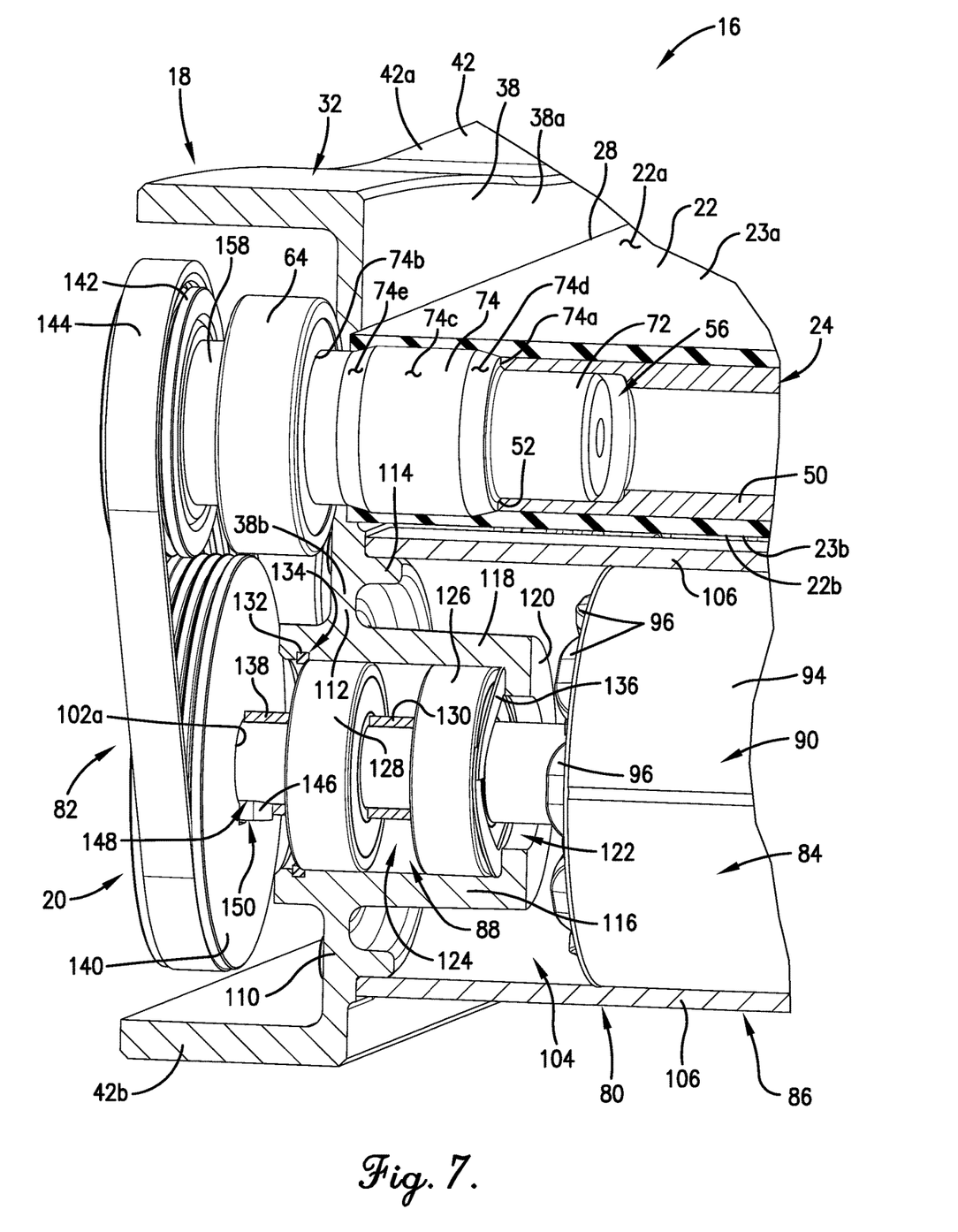
FIG. 7 is a further enlarged view of a portion of the conveyor assembly as shown in FIG. 6.

Outward lateral shifting of the driven or passive/following pulley 142 is restricted primarily via engagement of the driven pulley 142 against a retaining ring 154 disposed about the insert 56 so as to received in the notch or groove 78b, and engagement of the bearing 64 against an inner side of a shoulder 156 of the sidewall 40 of the chassis side rail 32 (see FIG. 5). Laterally inward shifting of the driven pulley 142 is restricted primarily by engagement of the driven pulley 142 with an outer side of the shoulder 156 of the sidewall 40. Additional spacing control is preferably provided by a spacer 158 disposed between the driven pulley 142 and the bearing 64.

Appropriate vertical and fore-aft positioning of the drive pulley 140 is facilitated primarily by secure fitment of the motor bearings 126 and 128 within the main body 118 of the bearing support structure 116.

Appropriate vertical and fore-aft positioning of the driven pulley 142 is facilitated primarily by the positioning of the roller bearing 64 in the bearing seat 64a.

Thus, the chassis 18, the motor bearings 126 and 128, the roller bearing 64, and other components cooperate to precisely locate the drive pulley 140 and the driven pulley 142 relative to one another. Such carefully controlled positioning enables the conveyor assembly 12 and, more specifically, the pulley drive 82 thereof, to be efficiently operable without the use of a tensioning device such as an idler pulley.

Although the illustrated pulley drive configuration is preferred, it is noted that is it permissible according to some aspects of the present invention for a tensioning device (including but not limited to an idler pulley) to be provided. Furthermore, an alternative or additional device or mechanism might be provided (i.e., in lieu of or in addition to the previously described pulley drive) to transmit power from the electric motor to the drive roller. For instance, a chain and sprocket drive might be utilized Further still, although it is preferred that the motor shaft 102 directly drive the drive pulley 140, as illustrated, it is permissible according to some aspects of the present invention for the motor to be configured or mounted in such a manner as to require an intermediate transmission to transfer power from the output shaft to the drive pulley.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A conveyor system including a conveyor assembly, said conveyor assembly comprising:
    a conveyor module;
    a power module; and
    a chassis supporting the conveyor module and the power module,
    said conveyor module including a roller rotatable about an axis and a conveyor belt shiftable in response to rotation of the roller,
    said power module providing rotational power to the roller,
    said power module including a power assembly and a drive configured to transmit rotational power to the roller from the power assembly,
    said power assembly including a power source and a housing at least substantially surrounding the power source,
    said chassis integrally forming a portion of the housing,
    said housing including a shell at least substantially circumscribing the power source,
    said shell being directly mounted to the chassis,
    said chassis defining a circumferential mounting lip,
    said lip being received within and abutting said shell.

2. The conveyor system of claim 1,
    said power source including an output shaft rotatable about an axis,
    said power assembly further including a bearing assembly rotatably supporting the output shaft,
    said housing including a bearing support structure supporting the bearing assembly,
    said chassis integrally forming the bearing support structure.

3. The conveyor system of claim 2,
    said bearing assembly including a pair of bearings supporting the shaft in a cantilevered manner.

4. The conveyor system of claim 3,
    each of said bearings being a unit bearing.

5. The conveyor system of claim 1,
    said power assembly comprising a motor assembly,
    said power source comprising a motor.

6. The conveyor system of claim 1,
    said drive comprising a pulley drive.

7. The conveyor system of claim 6,
    said power source including an output shaft rotatable about an axis,
    said pulley drive including—
        a drive pulley fixed to the output shaft to rotate therewith,
        a driven pulley spaced from the drive pulley and secured relative to the roller to rotate therewith, and
        a drive belt extending between and operably connecting the drive pulley and the driven pulley, such that driven rotation of the drive pulley by the output shaft results in rotation of the driven pulley, rotation of the roller, and shifting of the conveyor belt.

8. The conveyor system of claim 7,
    said pulley drive being devoid of a tensioner.

9. The conveyor system of claim 1,
    said shell being removably mounted to the chassis.

10. The conveyor system of claim 1,
    said chassis defining a bearing support structure,
    said power assembly including a bearing assembly received within the bearing support structure.

11. The conveyor system of claim 1,
    said conveyor system further including a moveable vehicle,
    said conveyor assembly being mounted to said vehicle.

12. The conveyor system of claim 11,
    said conveyor belt being supported above an upper surface of the vehicle.

13. The conveyor system of claim 12,
    said chassis being secured to the upper surface of the vehicle.

14. The conveyor system of claim 11,
    said vehicle being a powered vehicle.

15. The conveyor system of claim 14,
    said vehicle being an autonomous guided vehicle.

16. The conveyor system of claim 1,
    said roller including a tubular main body and an insert extending outwardly from said main body.

17. The conveyor system of claim 16,
    said conveyor assembly further including a roller bearing,
    said roller bearing rotatably supporting said insert.

18. The conveyor system of claim 1,
said roller being a drive roller,
said conveyor assembly further including an additional roller spaced from said drive roller,
said conveyor belt extending endlessly around said drive roller and said additional roller.

\* \* \* \* \*